United States Patent [19]
Guerin

[11] Patent Number: 5,774,156
[45] Date of Patent: Jun. 30, 1998

[54] IMAGE SELF-REGISTRATION FOR COLOR PRINTERS

[75] Inventor: Jean-Michel Guerin, Glendale, Calif.

[73] Assignee: Xerox Corporation, Stamford, Conn.

[21] Appl. No.: 715,149

[22] Filed: Sep. 17, 1996

[51] Int. Cl.[6] .......................... B41J 2/385; G03G 15/01; G01D 15/06
[52] U.S. Cl. .......................... 347/116; 347/129; 347/139
[58] Field of Search .................... 347/139, 129, 347/116, 115, 118; 358/298; 399/49, 71, 40, 41, 232, 231, 264, 296; 355/89

[56] References Cited

U.S. PATENT DOCUMENTS 5,291,296  3/1994  Hains ........................... 358/298
5,355,154  10/1994  Guerin ......................... 347/116
5,713,064  1/1998  Kasiske et al. .................. 399/71

*Primary Examiner*—N. Le
*Assistant Examiner*—L. Anderson
*Attorney, Agent, or Firm*—Fariba Rad

[57] ABSTRACT

There is disclosed a color xerographic printing system which utilizes a full length developer to develop a first latent image and registration marks on the margins along the first latent image. The color printing system of this invention, also utilizes two margin chargers prior to a second developer. Each one of the margin chargers restores the charge under the developed registration marks to prevent the registration marks from attracting more toner.

2 Claims, 6 Drawing Sheets

IMAGE SELF-REGISTRATION FOR COLOR PRINTERS

BACKGROUND OF THE INVENTION

This invention relates to a process of registration in a color xerographic printing system, and more particularly, to a self registration process in a Discharge Area Develop (DAD) system which utilizes a marking system for monitoring the toner placement of the first latent image for precise placement of toner on the subsequent latent images. It should be noted that hereinafter, for the purpose of simplicity, the "color xerographic printing system" is referred to as "color printing system".

Referring to FIG. 1, a color printing system 10 comprises a photoreceptor 12, and four color stations. However, for the purpose of simplicity, only two stations $A_1$ and $A_2$ are shown. Each color station, which is dedicated to a single color, comprises a charger 14, a raster output scanner (ROS) 16 and a developer 18. A charger is a device which charges the photoreceptor evenly prior to scanning, a ROS is a system which generates a latent image and a developer is a device which holds toner and deposits toner onto the latent image.

Referring to FIG. 2, there is shown a tangential (fast-scan) view of the raster output scanner 16 of the printing system 10 of FIG. 1. The raster scanning system 16 utilizes a laser light source 20, a collimator 22, pre-polygon optics 24, a multi-faceted rotating polygon mirror 26 as the scanning element, post polygon optics 28 and a photosensitive medium 30.

The laser light source 20 sends a light beam 32 to the rotating polygon mirror 26 through the collimator 22 and the pre-polygon optics 24. The collimator 22 collimates the light beam 32 and the pre-polygon optics 24 focuses the light beam 32 in the sagittal or cross-scan plane onto the rotating polygon mirror 28. The facets 34 of the rotating polygon mirror 26 reflect the light beam 32 and also cause the reflected light beam 32 to revolve about an axis near the reflection point of the facet 34. The reflected light beam 32 is utilized through the post polygon optics 28 to scan a photosensitive medium 30, such as a xerographic drum (photoreceptor). Referring to FIG. 3, since the photoreceptor 30 moves, the light beam 32 scans all the scan lines 36 of a document on the photoreceptor and generates a latent image.

Typically, in a color printing system, a latent image is being generated for each basic color and each latent image is being placed over the previous latent images. Referring to both FIGS. 1 and 3, each one of the color stations $A_1$ and $A_2$ generates one of the latent images. In the ROS 16 of each color station, the scanning light beam is modulated by the information of a given color. The scanning light beam 32 scans the photoreceptor 30 and discharges the photoreceptor according to the information of the given color to generate a latent image for the given color. While a latent image is being generated, the portion that is discharged will move under the developer 18 to be developed. Developing is defined as the latent image attracting toner from a toner station.

As the first latent image is being developed, the developed portion of the first latent image gradually moves into color station $A_2$. In this ROS 16 of the color station $A_2$, the light beam will be modulated by the information of a different color. The modulated light beam will start generating a new latent image over the first latent image.

In this manner each one of the following stations generates and develops a latent image over the previous latent images. The process of generating and developing a latent image is repeated four times, each by one of the stations, for four different colors (typically, cyan, yellow magenta and black). After the four different color toners are placed over each other, the toners will be transferred onto a sheet of paper.

Since each latent image is being generated over the previous latent image, the placement of each latent image is very critical. However, due to several factors such as the photoreceptor motion variation, vibration, thermal expansion, etc., the location of the scan lines of the latent images following the first latent image might be slightly different compared to the position of the scan lines of first latent image. Slight variation of the location of the scan lines causes the pixels of the same scan line of each latent image to be placed at different locations. This causes a problem known as mis-registration.

Referring to FIG. 4, one approach to match the scan lines of each latent image with the same scan lines of the first latent image is to place registration marks 40 and 42 on the margins 44 and 46 of each scan line, on the first latent image. Referring back to FIG. 1, the registration marks 40 and 42 will be developed as the first latent image is being developed. During the generation of the following latent images, the developed registration marks 40 and 42 of the developed first latent image (primary image 45) will be checked to determine if the current scan line is offset compared to the same scan line of the first latent image.

Checking or reading the registration marks can be achieved through different means such as CCD cameras, pattern recognition software and slit detectors.

When the scanning light beam is used to read the developed registration marks, the reflection of the light beam from the photoreceptor will be used. Referring to FIG. 5, the photoreceptor 30 reflects the light beam 32 (shown by solid line) where it does not have toner and absorbs the light beam 32' (shown by dashed line) where it has toner 43. This concept is used to read the registration marks. Two sensor 50 and 52 is placed over the photoreceptor on each margin 44 and 46 respectively to detect where the light beam is not reflected back (such as developed registration mark 43) to identify the developed registration marks on the margins.

During the generation of the following latent images, the scanning light beam will read the developed registration marks to compare the position of the current scan line with the position of the same scan line of the primary image 45. This method is appropriate for Charged Area Develop (CAD) which is also referred to as write-white as disclosed in U.S. Pat. No. 5,355,154. However, in the Discharged Area Develop (DAD) printing system which is also referred to as write-black, this method is not appropriate.

In a raster scanning system using DAD printing system, when a light beam strikes the photoreceptor, it discharges the photoreceptor. As a result, once a light beam scans over the developed registration marks for the purpose of detecting them, it will again discharge the photoreceptor under the developed registration marks. Therefore, the developed registration marks will attract more toner during the time the current latent image is being developed. The attraction of more toners on the registration marks is undesirable since more toner causes the marks to become large and loose their accuracy.

It is an object of this invention to provide a method of generating and reading the developed registration marks by a scanning light beam in a DAD printing system without attracting extra toner on the developed registration marks during the generation of the following latent images.

SUMMARY OF THE INVENTION

In accordance with the present invention, there is disclosed a color xerographic printing system with a discharge area develop (DAD) system which utilizes a scanning light beam to read registration marks placed on the margins of a first latent image. The scanning light beam while generating the second latent image over the first latent image scans over the margins to read the registration marks. Since in a DAD system, the discharged areas will be developed, once the light beam reads the registration marks, it will discharge the registration marks again. The printing system of this invention utilizes two margin chargers which are located prior to a second developer. Each one of the margin chargers restores the charge of the photoreceptor under the developed registration marks in order to prevent them from attracting toner while passing through the second developer.

DETAILED DESCRIPTION OF THE INVENTION

Figure 1:
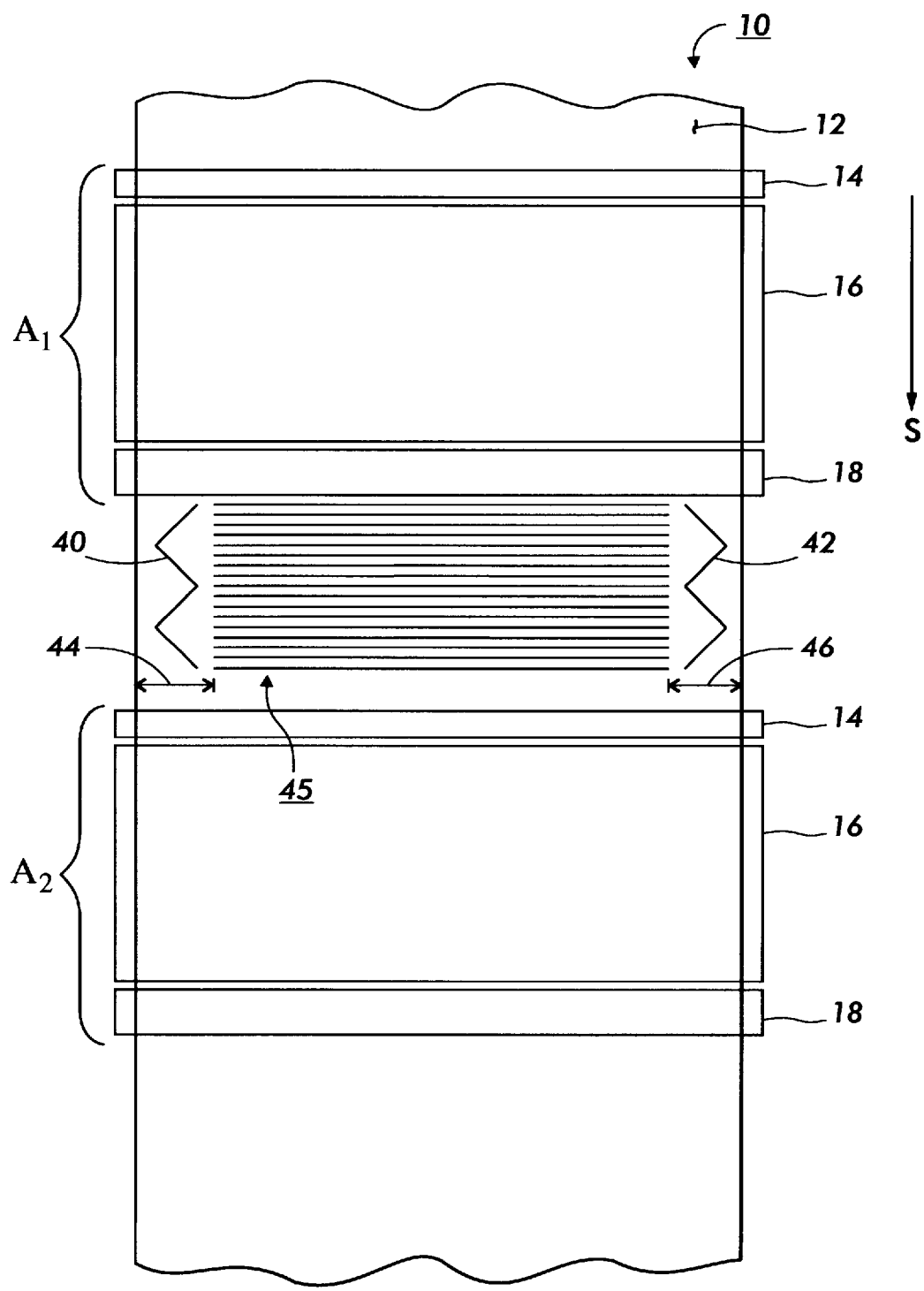
FIG. 1 shows a prior art color printing system.
Figure 2:
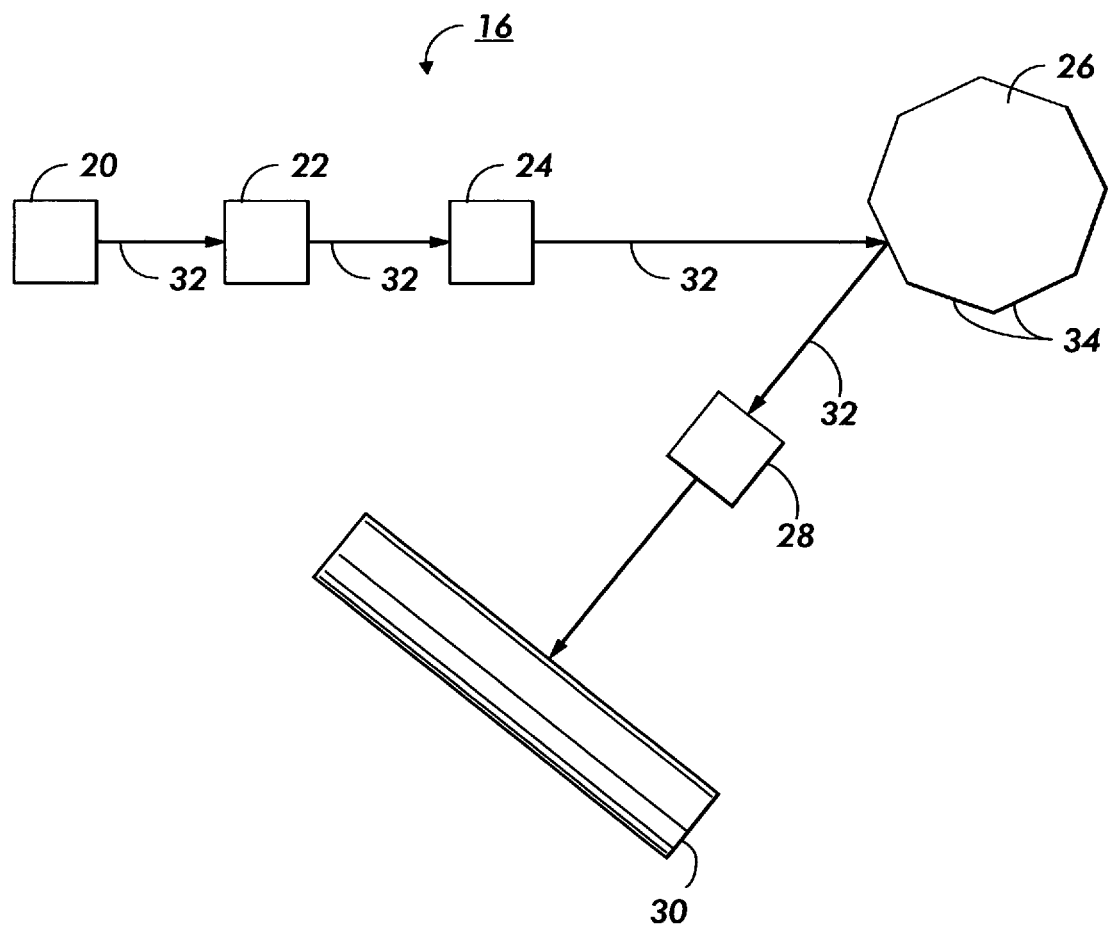
FIG. 2 shows a tangential (fast-scan) view of the raster output scanner of the printing system of FIG. 1.
Figure 3:
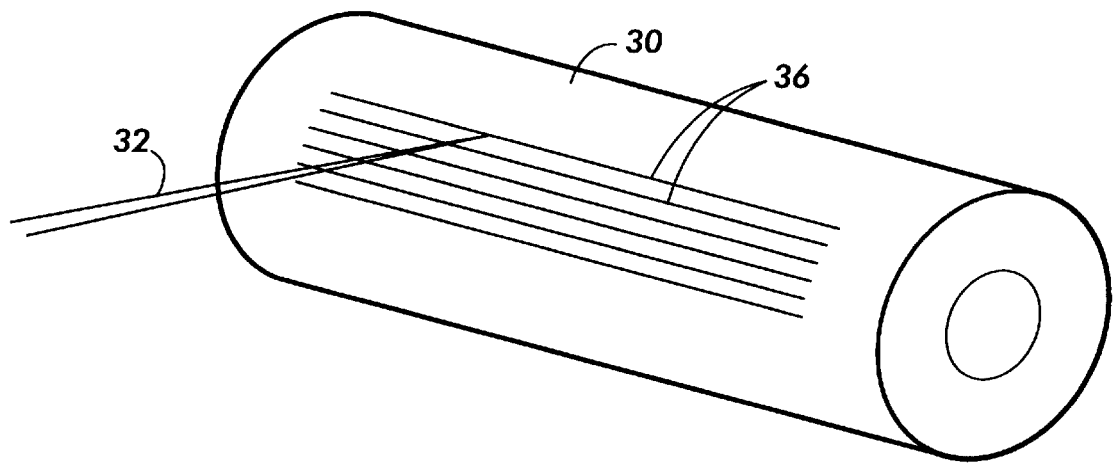
FIG. 3 shows a light beam scanning the scan lines of a latent image in a prior art system.
Figure 4:
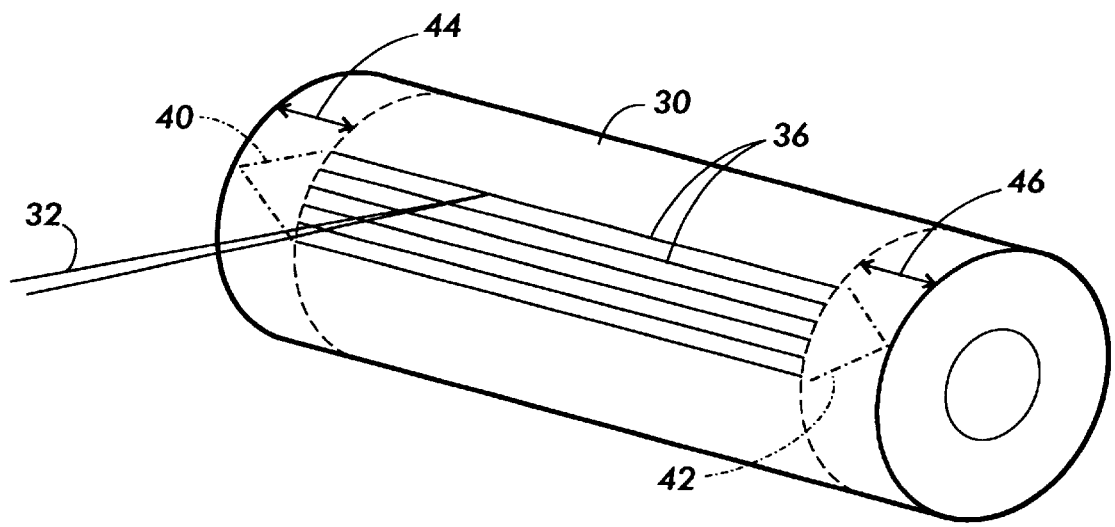
FIG. 4 shows a light beam scanning a latent image and placing registration marks on the margins in a prior art system.
Figure 5:
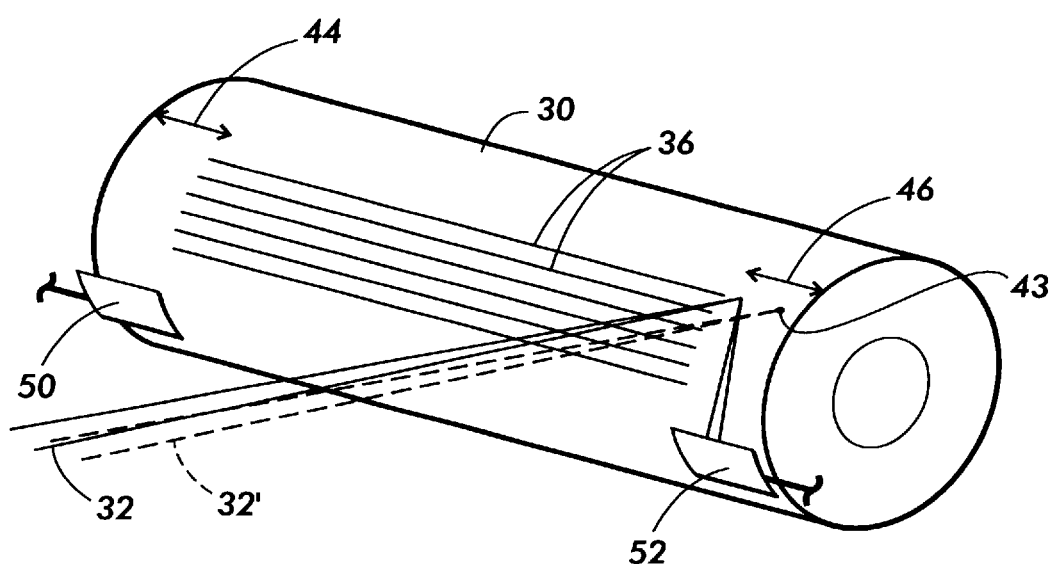
FIG. 5 shows a photoreceptor which reflects the scanning light beam where it does not have toner and absorbs the scanning light beam where it has toner in a prior art system.
Figure 6:
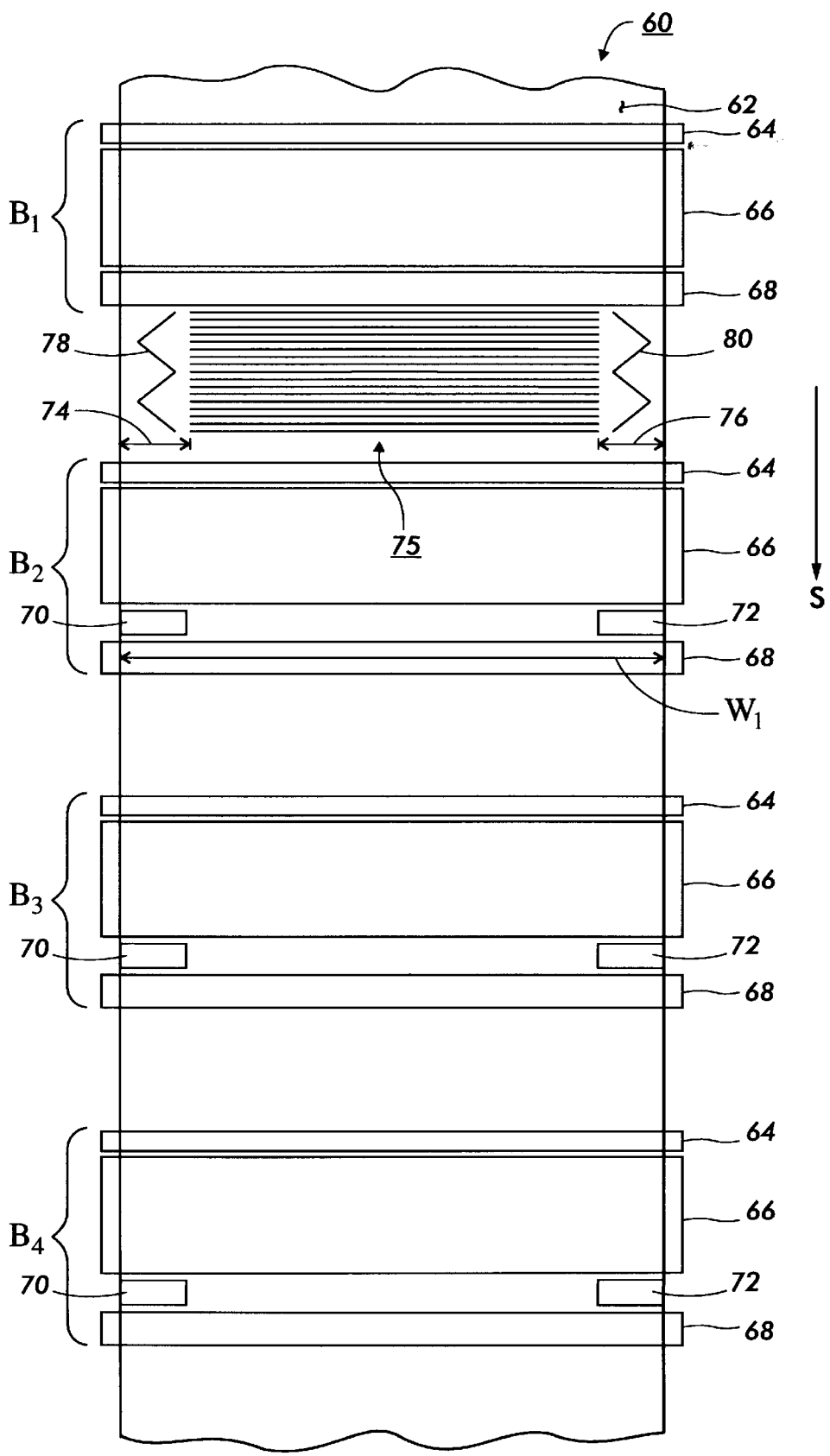
FIG. 6 shows a printing system of this invention.

Referring to FIG. 6, there is shown a printing system 60 of this invention. The printing system 60 comprises a photoreceptor 62 and four color stations $B_1$, $B_2$, $B_3$ and $B_4$. For the purpose of clarity, the photoreceptor 62 is unrolled and is shown as a flat belt 62. Each one of the color stations $B_1$, $B_2$, $B_3$ and $B_4$ comprises a full length charger 64, a full length ROS 66 and a full length developer 68. It should be noted that in this specification, "full length" shall mean "a length which covers the full width $W_1$ of the photoreceptor 62". Each one of the color stations $B_2$, $B_3$ and $B_4$ has margin chargers 70 and 72 on margins 74 and 76 respectively. Margin chargers 70 and 72 are placed after the ROS 66 and prior to the developer 68.

In operation, in the station $B_1$, the charger 64 uniformly charges the photoreceptor 62 prior to the generation of the first latent image. Subsequently, a scanning light beam (not shown) starts generating the first latent image by scanning the scan lines of the first latent image. In order to align the first latent image with the following latent images, the light beam will place registration marks 78 and 80 on each scan line on the side margins 74 and 76 of the first latent image. Margins 74 and 76 are located along the edge of the photoreceptor and along the first latent image. Each one of the margins 74 and 76 are located on one side of the first latent image or the primary image 75. For placing the marks 78 and 80, the light beam will discharge the photoreceptor 62 in the margins 74 and 76 with a given pattern. In the preferred embodiment of this invention, chevron patterns are used for the registration marks 78 and 80. However, any pattern that could be used to match the scan lines of different latent images can replace the chevron patterns of this invention.

As the first latent image is being developed to create a primary image 75, since the developer 68 is a full length developer, toner will be deposited on the latent image and the registration marks 78 and 80. The developed registration marks 78 and 80 will be used to align the following latent images with the primary image 75.

As the primary image 75 leaves the developer 68 of the station $B_1$, it moves into the station $B_2$. In the station $B_2$, the full length charger 64 uniformly charges the photoreceptor full length under the primary image 75 and also the margin areas. Then the primary image 75 moves under the ROS of station $B_2$ where a light beam starts scanning the second latent image over the primary image 75. The scanning light beam of the ROS 66 of the station $B_2$ will scan over the developed registration marks 78 and 80 at the start and at the end of each scan line for the purpose of reading the registration marks in order to align each scan line of the second latent image with the scan lines of the primary image 75.

In the station $B_2$ and the following stations, the photoreceptor under the developed registration marks will be discharged (creating a latent image) during the time the scanning light beam reads the developed registration marks. As the developed registration marks move toward the developer 68, the developed registration marks 78 and 80 will move under the margin chargers 70 and 72 respectively. The margin charges 70 and 72 restore the charge of the photoreceptor under the developed registration marks 78 and 80. As a result, when the developed registration marks 78 and 80 move under the full length developer 68, they do not attract any toner.

Therefore, by using the disclosed embodiment of this invention in a DAD system, a light beam reads the registration marks without causing the developed registration marks to attract extra toner.

It should be noted that the disclosed embodiment of this invention is described based on a single pass printing system. In a single pass printing system since there are four stations, a paper has to go through the printing system only once. However, the disclosed embodiment of this invention can also be utilized in a multi-pass system in which, there is only one station responsible for generating four latent images. In a multi-pass system, a sheet of paper has to pass through the same station four times.

Figure 7:
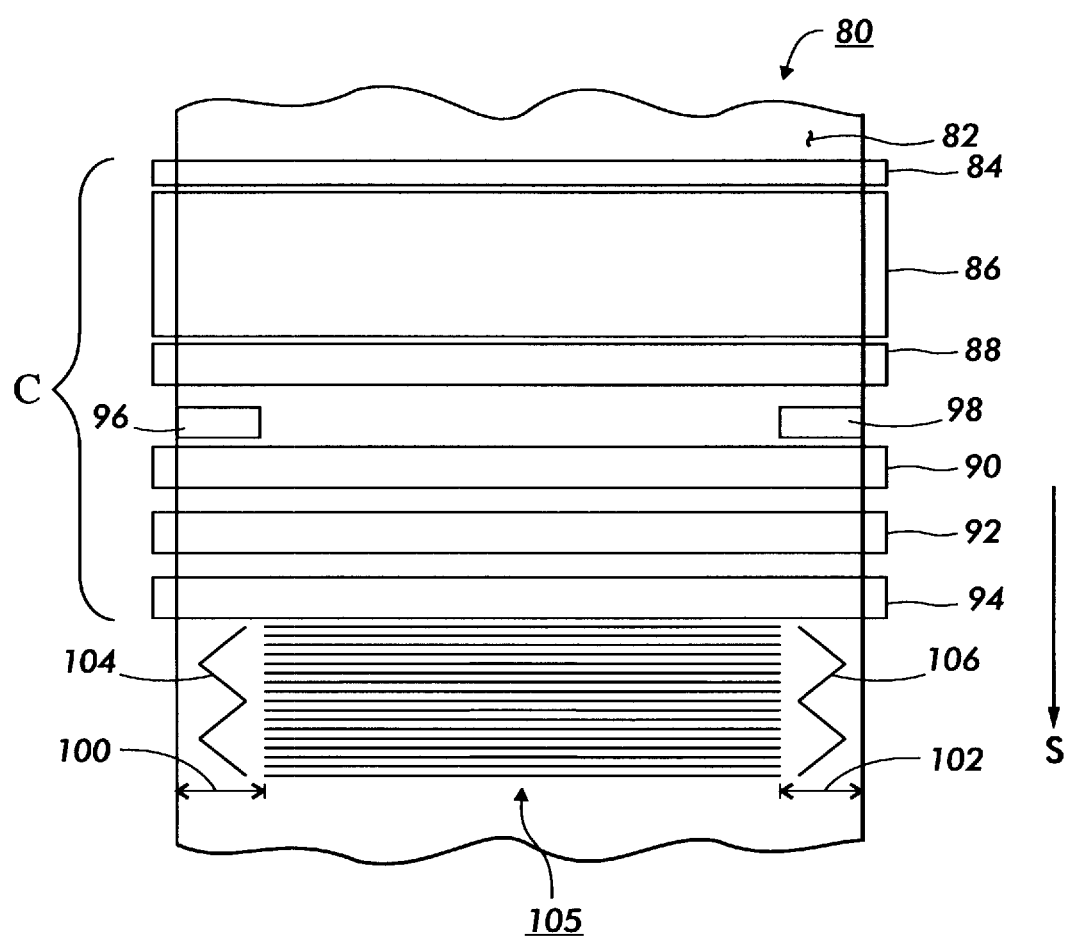
FIG. 7 shows a multi-pass color printing system of this invention.

Referring to FIG. 7, there is shown a multi-pass color printing system 80 of this invention. The printing system 80 comprises a photoreceptor 82 and one color stations C. For the purpose of clarity, the photoreceptor 82 is unrolled and is shown as a flat belt 82. The printing system 80 which is a DAD printing system moves in the direction shown as S.

The color station C has a full length charger 84, a full length ROS 86, four full length developers 88, 90, 92, 94 and two margin chargers 96 and 98 on the margins 100 and 102 respectively. In the printing system 80, the first latent image and the registration marks will be generated by ROS 86 and will be developed by the developer 88 to create the primary image 105 and the developed registration marks 104 and 106.

The photoreceptor 82 rotates once and the primary image 105 and the registration marks enter the color station C one more time. On the second pass, the ROS 86 generates a second latent image over the primary image 105 and at the same time reads the developed registration marks 102 and 104. On the second pass the developer 90 develops the second latent image. However, since there are two margin charges 96 and 98 prior to the develops 90, 92 and 94, the charge under the developed registration marks will be restored. Therefore, while the second latent image is being developed by the developer 90, the developed registration marks 104 and 106 will not attract any more toner.

In the same manner, the photoreceptor 82 rotates two more times and the ROS 86 creates a third and a fourth latent image. The third latent image will be developed by the developer 92 and the fourth latent image will be developed by the developer 94. Again since the margin chargers 96 and 98 are located prior to the develops 92 and 94, while the third and fourth latent images are being developed, the developed registration marks will not attract any more toner.

It should further be noted that numerous changes in details of construction and the combination and arrangement of elements and materials may be resorted to without departing from the true spirit and scope of the invention as hereinafter claimed.

I claim:

1. In a color xerographic printing system wherein a light beam is scanned across a charged medium to discharge the medium and the discharged portion of the medium is developed with marking material:

a light source having a lasing diode for emitting a light beam;

a medium having two opposite edges, said medium having a registration marking area along one edge of said medium and a primary image area located adjacent to said registration marking area;

first charging means for charging said registration marking area and said primary image area;

means for scanning the light beam across said medium to form a latent image in said registration marking area and said primary image area;

said scanning light beam, when on, being of an intensity to discharge the charged portions of said registration marking area and said primary image area charged by said first charging means;

a first developer station having a length generally corresponding to at least a length across said medium of said registration marking area and said primary image area for developing a latent image in each of said areas;

means for detecting reflection of the scanning light beam of the image at said registration marking area which was not developed at said first developer station;

a second developer station having a length generally corresponding to the length across said medium of said primary image area and said registration marking area for developing a latent image which is formed over an image in the primary image area which was developed at said first developer station; and second charging means for restoring charge in said registration marking area;

said second charging means having a length corresponding to said registration marking area;

means for activating said second charging means after a latent image is formed over a developed image in said primary image area which was developed at said first developer station and prior to development of said last mentioned latent image at said second development station to prevent development of any latent image formed in said registration marking area over a developed image in said registration marking area which was developed at said first developer station.

2. In a color xerographic printing system wherein a light beam is scanned across a charged medium to discharge the medium and the discharged portion of the medium is developed with marking material:

a first raster output scanner;

a second raster output scanner;

said first raster output scanner having a light source having a lasing diode for emitting a first light beam;

a medium having two opposite edges, said medium having a registration marking area along one edge of said medium and a primary image area located adjacent to said registration marking area;

first charging means for charging said registration marking area and said primary image area;

said first raster output scanner having means for scanning the first light beam across said medium to form a latent image in each of said registration marking area and said primary image area;

said first scanning light beam, when on, being of an intensity to discharge the charged portions of said registration marking area and said primary image area charged by said first charging means;

a first developer station having a length generally corresponding to at least a length across said medium of said registration marking area and said primary image area for developing a latent image in each of said areas;

said second raster output scanner having a light source having a lasing diode for emitting a second light beam;

said second raster output scanner having means for scanning the second light beam across said medium to form a latent image in each of said registration marking area and said primary image area;

said second scanning light beam, when on, being of an intensity to discharge the charged portions of said registration marking area and said primary image area;

means for detecting reflection of the second scanning light beam of the image at said registration marking area which was not developed at said first developer station;

a second developer station having a length generally corresponding to the length across said medium of said primary image area and said registration marking area for developing a latent image which is formed over an image in the primary image area which was developed at said first developer station; and second charging means for restoring charge in said registration marking area;

said second charging means having a length corresponding to said registration marking area;

means for activating said second charging means after a latent image is formed over a developed image in said primary image area which was developed at said first developer station and prior to development of said last mentioned latent image at said second development station to prevent development of any latent image formed in said registration marking area over a developed image in said registration marking area which was developed at said first developer station.

\* \* \* \* \*